United States Patent
Tateishi et al.

(10) Patent No.: US 7,736,398 B2
(45) Date of Patent: Jun. 15, 2010

(54) METHOD OF MANUFACTURING CONDUCTIVE POLYMER ELECTROLYTIC CAPACITOR

(75) Inventors: Kazuyuki Tateishi, Kakogawa (JP); Mutsuaki Murakami, Settsu (JP); Hiroyuki Furutani, Takatsuki (JP)

(73) Assignee: Kaneka Corporation, Osaka-Shi (JP)

( * ) Notice: Subject to any disclaimer, the term of this patent is extended or adjusted under 35 U.S.C. 154(b) by 38 days.

(21) Appl. No.: 12/071,695

(22) Filed: Feb. 25, 2008

(65) Prior Publication Data
US 2008/0201926 A1    Aug. 28, 2008

(30) Foreign Application Priority Data

Feb. 26, 2007 (JP) .............................. 2007-045529
Jan. 18, 2008 (JP) .............................. 2008-009760

(51) Int. Cl.
*H01G 9/00*    (2006.01)

(52) U.S. Cl. .................... 29/25.03; 29/25.01; 29/25.02; 361/516; 361/517; 361/518; 361/519; 361/520; 361/521; 361/522; 361/527; 361/530; 361/535; 361/536; 361/537; 361/538; 361/539

(58) Field of Classification Search .................. 29/502, 29/523, 527, 530; 361/516–521, 535–539
See application file for complete search history.

(56) References Cited

U.S. PATENT DOCUMENTS

| | | | | |
|---|---|---|---|---|
| 5,031,077 A | * | 7/1991 | Niwa et al. | 361/527 |
| 5,914,852 A | * | 6/1999 | Hatanaka et al. | 361/523 |
| 7,312,977 B2 | * | 12/2007 | Yamada et al. | 361/523 |

FOREIGN PATENT DOCUMENTS

| | | | |
|---|---|---|---|
| JP | 03-096210 A | | 4/1991 |
| JP | 2003-022938 | * | 1/2003 |
| JP | 2003-022938 A | | 1/2003 |
| WO | WO 2004030004 | * | 4/2004 |

OTHER PUBLICATIONS

Inoue et al., "A Study on Increase of Withstand Voltage of Conductive Polymer Capacitor", Electrolytic Condenser Review, vol. 53 (1), 95 (2002) pp. 95-100.

* cited by examiner

*Primary Examiner*—Charles D Garber
*Assistant Examiner*—Yasser A Abdelaziez
(74) *Attorney, Agent, or Firm*—Birch, Stewart, Kolasch & Birch, LLP

(57) ABSTRACT

A method is described for manufacturing a conductive polymer electrolytic capacitor. The method includes a step of aging a capacitor element including an electrolyte containing a conductive polymer and an ionic liquid by applying an aging voltage y (V) to the capacitor element to satisfy the following formula (1) or the following formula (2). In the following formulae (1) and (2), x represents a forming voltage for a valve metal. An electrolytic capacitor having a high withstand voltage is implemented by this method.

$$0.5x \leq y \leq x (0 < x \leq 48) \quad (1)$$

$$24 \leq y \leq x (48 < x) \quad (2).$$

10 Claims, 2 Drawing Sheets

US 7,736,398 B2

METHOD OF MANUFACTURING CONDUCTIVE POLYMER ELECTROLYTIC CAPACITOR

This nonprovisional application is based on Japanese Patent Applications Nos. 2007-045529 and 2008-009760 filed with the Japan Patent Office on Feb. 26, 2007 and Jan. 18, 2008, respectively, the entire contents of which are hereby incorporated by reference.

BACKGROUND OF THE INVENTION

1. Field of the Invention

The present invention relates to a method of manufacturing a conductive polymer electrolytic capacitor, and more specifically, it relates to a method of manufacturing a conductive polymer electrolytic capacitor comprising a solid electrolyte containing a conductive polymer and an ionic liquid.

2. Description of the Background Art

An electrolytic capacitor employing a conductive polymer for an electrolyte and a cathode conductive layer is known in general. In relation to such a conductive polymer electrolytic capacitor, it is known that an electrolytic capacitor exhibiting a low leakage current and having high heat resistance and high moisture resistance can be manufactured by employing a dopant hardly damaging a dielectric layer consisting of an anodized film or also using a solid organic onium salt having repairability for a valve metal (refer to Japanese Patent Laying-Open No. 2003-22938, for example).

However, the conductive polymer essentially has no anodic oxidizability, whereby improvement in the withstand voltage characteristic of the conductive polymer electrolytic capacitor is limited. Japanese Patent Laying-Open No. 3-96210 (1991) describes a method of improving the withstand voltage by aging an anodic body having a solid electrolytic layer thereby performing re-repair/forming, as means for solving this problem.

However, this document, describing a method of aging the anodic body by applying a constant voltage not more than half a forming voltage, discloses that the yield is remarkably deteriorated if the forming voltage is increased. Thus, there is no technique disclosing that at least 50% of a forming voltage for a valve metal can be extracted as a normal voltage in relation to a conductive polymer electrolytic capacitor.

Further, it is known that dissociation between a forming voltage and a withstand voltage is increased when the forming voltage is increased (refer to Electrolytic Condenser Review, Vol. 53 (1), 95 (2002)). While the forming voltage and the withstand voltage are equivalent to each other up to about 30 V (however, the actual working voltage is set to about 15 V in consideration of safety), the withstand voltage is remarkably reduced at a forming voltage exceeding 30 V. The withstand voltage is 50 V and the practical voltage is not more than 24 V whether forming is performed at 100 V or 300 V. When the forming voltage is increased, further, the capacitance is unpractically reduced. In general, therefore, it is extremely difficult to manufacture an electrolytic capacitor having an actual working voltage of at least 24 V in relation to a conductive polymer electrolytic capacitor.

In order to solve this problem, it is attempted to provide an insulating layer referred to as a buffer layer on a dielectric film. If such a layer is provided, however, equivalent series resistance (ESR) or a tan δ characteristic is deteriorated, to damage the high performance of the conductive polymer electrolytic capacitor.

SUMMARY OF THE INVENTION

The present invention has been proposed in order to solve the aforementioned problems, and an object thereof is to provide a method of manufacturing an electrolytic capacitor, containing a conductive polymer as a solid electrolyte, having a high withstand voltage characteristic (preferably having a withstand voltage of at least 50%, more preferably at least 80% of a forming voltage) without increasing equivalent series resistance (ESR).

In the present invention, the aforementioned object is attained by aging a capacitor element including an electrolyte containing an ionic liquid at an aging voltage $\underline{y}$ in the range of 50% to 100% of a forming voltage $\underline{x}$ applied for forming a dielectric oxide film on a valve metal when the forming voltage $\underline{x}$ is not more than 48 V, or in the range of at least 24 V and not more than the forming voltage $\underline{x}$ when the forming voltage $\underline{x}$ is larger than 48 V.

The present invention relates to a method of manufacturing a conductive polymer electrolytic capacitor having a capacitor element including an electrolyte containing a conductive polymer prepared from a monomer (A) and an ionic liquid (B) and an electrode consisting of a valve metal, comprising the step of aging the capacitor element including the electrolyte by applying an aging voltage $\underline{y}$ (V) to the capacitor element including the electrolyte to satisfy the following formula (1) or the following formula (2):

$$0.5x \leq y \leq x (0 < x \leq 48) \quad (1)$$

$$24 \leq y \leq x (48 < x) \quad (2)$$

In the above formulas (1) and (2), $\underline{x}$ represents a forming voltage (V) for the valve metal.

In the present invention, the capacitor element including the electrolyte is preferably aged by applying the aging voltage $\underline{y}$ (V) to the capacitor element including the electrolyte to satisfy the following formula (3) or the following formula (4):

$$0.6x \leq y \leq 0.88x (0 < x \leq 48) \quad (3)$$

$$28.8 \leq y \leq 0.88x (48 < x) \quad (4)$$

In the above formulas (3) and (4), $\underline{x}$ represents the forming voltage (V) for the valve metal.

The molar ratio $N_B/N_A$ between the monomer (A) and the ionic liquid (B) is preferably 0.01/1 to 0.5/1.

The monomer (A) is preferably at least one monomer selected from a group consisting of pyrrole and a derivative thereof, thiophene and a derivative thereof, aniline and a derivative thereof and quinone and a derivative thereof.

An anionic component of the ionic liquid (B) preferably includes at least one component selected from a group consisting of a carboxylate anion derivative, a sulfonyl imide anion derivative, a fluoroborate anion derivative, a nitrate anion derivative, a cyanoimide anion derivative, a sulfonate anion derivative and an alkoxysulfonate anion derivative.

The aforementioned sulfonate anion derivative is preferably an anionic component expressed in the following general formula (1):

$$R_1\text{—}SO_3^- \quad (I)$$

In the above general formula (1), $R_1$ represents an aliphatic hydrocarbon radical having a carbon number of 1 to 30, which may be substituted by an O, S, NHCO or CO radical, and may contain at least one fluorine atom. Further, $R_1$ in the general formula (I) is more preferably a straight-chain saturated hydrocarbon radical having a carbon number of 1 to 7.

The aforementioned alkoxysulfonate anion derivative is preferably an anionic component expressed in the following general formula (II):

$$R_2\text{—}OSO_3^-  \qquad (II)$$

In the above general formula (II), $R_2$ represents an aliphatic hydrocarbon radical having a carbon number of 1 to 30, which may be substituted by an O, S, NHCO or CO radical, and may contain at least one fluorine atom. Further, $R_2$ in the general formula (II) is more preferably a straight-chain saturated hydrocarbon radical having a carbon number of 1 to 7.

A cationic component of the ionic liquid (B) preferably includes at least one component selected from a group consisting of ammonium and a derivative thereof, imidazolinium and a derivative thereof, pyridinium and a derivative thereof, pyrrolidinium and a derivative thereof, pyrrolinium and a derivative thereof, pyrazinium and a derivative thereof, pyrimidinium and a derivative thereof, triazonium and a derivative thereof, triazinium and a derivative thereof, triazine derivative cation, quinolinium and a derivative thereof, isoquinolinium and a derivative thereof, indolinium and a derivative thereof, quinoxalinium and a derivative thereof, piperazinium and a derivative thereof, oxazolinium and a derivative thereof, thiazolinium and a derivative thereof, morpholinium and a derivative thereof and piperazine and a derivative thereof.

According to the present invention, a conductive polymer electrolytic capacitor having a high withstand voltage, low ESR and a large capacitance can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
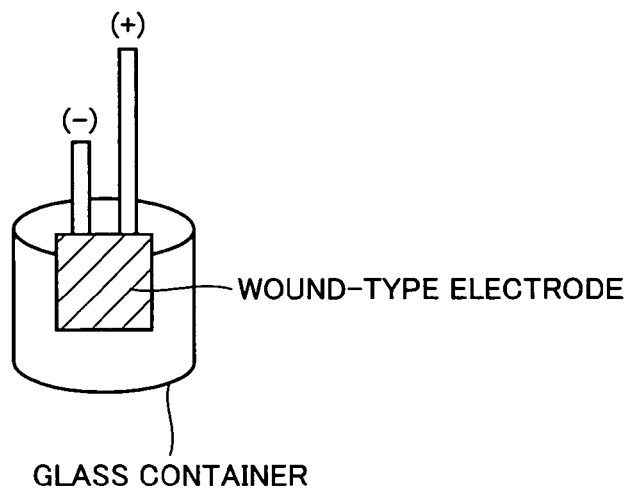
FIG. 1 is a schematic diagram showing a measurement cell employed for repair/forming of a wound-type electrode.

The inventors have found that an aging voltage can be set in the range of 50% to 100% of a forming voltage when the forming voltage is not more than 48 V, or in the range of at least 24 V and not more than the forming voltage when the forming voltage is larger than 48 V, by introducing an ionic liquid into an electrolyte in a conductive polymer electrolytic capacitor including the electrolyte and an electrode consisting of a valve metal. This is a remarkable difference as compared with a conventional conductive polymer electrolytic capacitor, which has been hard to age at a voltage of at least 50% of the forming voltage. Further, it is possible to stably manufacture a conductive polymer electrolytic capacitor having a high withstand voltage with an actual working voltage of at least 24 V, which has been impossible to manufacture in general, by preparing the capacitor through such an aging step.

According to the present invention, the electrolyte of the electrolytic capacitor contains a conductive polymer and an ionic liquid. It is indispensable for the present invention that the conductive polymer electrolyte contains the ionic liquid (the conductive polymer is partially or entirely composited with the ionic liquid). Thus, excellent anodic oxidizability of the ionic liquid is appended in addition to the excellent electronic conductivity of the conductive polymer electrolyte, whereby an ideal capacitor electrolyte simultaneously satisfying a low impedance, a high withstand voltage and a high capacitance can be implemented. In other words, interelectrode resistance can be remarkably reduced in a conductive portion due to the high conductivity of the conductive polymer, whereby an electrolytic capacitor having an excellent impedance characteristic can be easily obtained while an electrolytic capacitor having a high withstand voltage and exhibiting a low leakage current can be obtained by interposing the ionic liquid having repairability for a dielectric oxide film of a valve metal. Further, it is estimated that the ionic liquid serves as a binder between an electrode and the conductive polymer and between the conductive polymer and another conductive polymer, to increase the capacitance of the electrolytic capacitor.

However, the ionic liquid cannot exhibit excellent anodic oxidizability until a voltage is applied thereto, and does not naturally recover the dielectric oxide film from stress applied in the manufacturing process for the electrolytic capacitor or a damage resulting from a chemical action in polymerization. In order to attain the anodic oxidizability of the ionic liquid, therefore, a voltage application step such as an aging step is necessary. While the details of the mechanism thereof are not yet clarified, it has been found that an aging voltage higher than that in the prior art can be employed in the present invention due to the ionic liquid added to the electrolyte. According to this step, an anionic part of the ionic liquid covers a defective portion of the oxide film and forms an insulating film, for repairing the oxide film.

The monomer (A) constituting the conductive polymer is not particularly restricted, but is preferably selected from thiophene and a derivative thereof, pyrrole and a derivative thereof, aniline and a derivative thereof, quinone and a derivative thereof, quinoline and a derivative thereof and furan and a derivative thereof, in consideration of high conductivity in formation of the polymer and stability in the air.

While 3,4-ethylene dioxythiophene, 3-alkyl thiophene (butyl radical, hexyl radical, octyl radical or dodecyl radical as alkyl radical), fluorophenyl thiophene or allyl thiophene, for example, can be listed as the derivative of thiophene, the present invention is not restricted to this.

While a material having a pyrrole backbone with a substituent such as a hydroxyl radical, a carboxyl radical or an alkyl radical, for example, can be listed as the derivative of pyrrole, the present invention is not restricted to this.

While a material having a substituent such as an alkyl radical, a cyano radical, a sulfone radical or a carboxyl radical on an aniline backbone, for example, can be listed as the derivative of aniline, the present invention is not restricted to this.

While benzoquinone having a substituent, naphthoquinone having a substituent or anthraquinone having a substituent, for example, can be listed as the derivative of quinone, the present invention is not restricted to this.

In particular, a conductive polymer consisting of poly(2,3-dihydrothieno-[3,4-b]-1,4-dioxin) (also referred to as poly-3, 4-ethylene dioxythiophene) or polypyrrole is preferably employed in consideration of conductivity and heat resistance.

In the present invention, the ionic liquid (B) (abbreviated as "ILs" if necessary) contained in the electrolyte, also referred to as room temperature molten salt, is in a liquid state around the room temperature, although the same is constituted of only ions. The ionic liquid is formed by a combination of a cationic component such as imidazolium and a proper anionic component. The ionic liquid is conceivably not partially ionized/dissociated but formed by only ions and ionized by 100%, dissimilarly to a general organic solvent.

As examples of the cationic component constituting the ionic liquid (B), ammonium and a derivative thereof, imidazolinium and a derivative thereof, pyridinium and a derivative thereof, pyrrolidinium and a derivative thereof, pyrrolinium and a derivative thereof, pyrazinium and a derivative thereof, pyrimidinium and a derivative thereof, triazonium and a derivative thereof, triazinium and a derivative thereof, triazine derivative cation, quinolinium and a derivative thereof, isoquinolinium and a derivative thereof, indolinium and a derivative thereof, quinoxalinium and a derivative thereof, piperazinium and a derivative thereof, oxazolinium and a derivative thereof, thiazolinium and a derivative thereof, morpholinium and a derivative thereof and piperazine and a derivative thereof can be listed. In particular, imidazolinium and a derivative thereof, ammonium and a derivative thereof and pyridinium and a derivative thereof can be preferably employed in the present invention.

Any ionic liquid basically has repairability/forming ability. Therefore, the ionic liquid employed in the present invention is not in any way limited. However, it has been recognized that the repairability/forming ability of the ionic liquid remarkably depends on the anionic component thereof. In the present invention, therefore, an anionic component having excellent repairability/forming ability is preferably selected. More specifically, an ionic liquid containing at least one anionic component selected from a carboxylate anion derivative, a sulfonyl imide anion derivative, a fluoroborate anion derivative, a nitrate anion derivative, a cyanoimide anion derivative, a sulfonate anion derivative and an alkoxysulfonate anion derivative has excellent repairability/forming ability, and is preferably employed.

An ionic liquid containing anionic components of a sulfonate anion derivative (notated as $R_1$—$SO_3^-$) and an alkoxysulfonate anion derivative (notated as $R_2$—$OSO_3^-$) has particularly excellent repairability/forming ability, and is more preferably employed. In the above formulas, $R_1$ and $R_2$ are preferably monovalent aliphatic hydrocarbon radicals each having a carbon number of 1 to 30. $R_1$ and $R_2$ may have branches, and may be substituted by radicals of O, S, NHCO or CO capable of bonding alkyl radicals to each other. Further, each of $R_1$ and $R_2$ may contain at least one fluorine atom.

$R_1$ and $R_2$ are preferably straight-chain aliphatic hydrocarbon radicals each having a carbon number of 1 to 7. As specific examples of the sulfonate anion derivative and the alkoxysulfonate anion derivative having substituents, $CH_3OSO_3^-$, $CH_3CH_2OSO_3^-$, $CH_3CH_2CH_2OSO_3^-$, $CH_3(CH_2)_2CH_2OSO_3^-$, $CH_3(CH_2)_3CH_2OSO_3^-$, $CH_3(CH_2)_4CH_2OSO_3^-$, $CH_3(CH_2)_5CH_2OSO_3^-$, $CH_3(CH_2)_3CH_2SO_3^-$, $CH_3(CH_2)_4CH_2SO_3^-$ and $CH_3(CH_2)_5CH_2SO_3^-$ can be listed.

When the ionic liquid (B) contains both of the sulfonate anion derivative and the alkoxysulfonate anion derivative as the anionic components, $R_1$ and $R_2$ may be identical to or different from each other.

In the present invention, the molar ratio $N_B/N_A$ between the monomer (A) constituting the conductive polymer of the electrolyte and the ionic liquid (B) constituting the electrolyte is preferably 0.01/1 to 0.5/1, more preferably 0.02/1 to 0.3/1 in view of a high withstand voltage and a low impedance of the conductive polymer capacitor prepared after chemical polymerization. If the molar ratio $N_B/N_A$ is less than 0.01/1, the effect of adding the ionic liquid hardly appears, and the effect of improving the withstand voltage is reduced. If the molar ratio $N_B/N_A$ is in excess of 0.5/1, on the other hand, ESR, a tan δ characteristic, a frequency characteristic etc. of the electrolytic capacitor tend to deteriorate. In other words, the molar ratio $N_B/N_A$ is preferably at least 0.01/1, more preferably at least 0.02/1 in view of the withstand voltage, and preferably not more than 0.5/1, more preferably not more than 0.3/1 in view of a low impedance.

A method of manufacturing a conductive polymer electrolytic capacitor according to the present invention is now described. In the method of manufacturing a conductive polymer electrolytic capacitor including an electrolyte and an electrode according to the present invention, the electrolytic capacitor can be prepared by forming an electrolyte containing a conductive polymer and an ionic liquid between an anode foil and a cathode foil in a wound-type capacitor element formed by winding the anode foil consisting of a valve metal provided with a dielectric oxide film on the surface thereof and the cathode foil with a separator interposed therebetween, thereafter aging the capacitor element, then storing the capacitor element in a bottomed cylindrical aluminum case, for example, and sealing an opening of the aluminum case with a sealer, for example, although not particularly restricted. The valve metal is prepared from aluminum or tantalum, for example.

The dielectric oxide film can be formed by a well-known method of dipping the valve metal in an aqueous solution of ammonium adipate or the like and applying a forming voltage x, for example.

In the present invention, the electrolyte can be formed by a method (chemical polymerization) of oxidatively polymerizing the monomer (A) in the presence of the ionic liquid (B) with a solution containing the monomer (A) constituting the conductive polymer and an oxidant, for example, or electrolytic polymerization. The chemical polymerization is a method of forming a conductive polymer by performing polymerization by oxidatively dehydrogenating a raw monomer such as pyrrole, for example, in the presence of a proper oxidant, and preferably employed in the present invention.

Persulfate, hydrogen peroxide, diazonium salt, halogen or halide or a salt of a transition metal such as iron, copper or manganese can be used as the oxidant. In chemical polymerization, an anionic component of the oxidant is incorporated into the polymer as a dopant in the polymerization process, whereby a conductive polymer can be obtained through a one-stage reaction. When chemical polymerization is performed in the presence of the ionic liquid, the anionic component of the ionic liquid may be incorporated into the conductive polymer as a dopant, particularly preferably for the object of the present invention. In other words, while the electrolyte can be formed by chemically polymerizing the monomer (A) for forming the conductive polymer and thereafter adding the ionic liquid (B) to the electrolyte or by performing chemical polymerization in the presence of the ionic liquid (B) in the present invention, the latter method is more preferable.

As a method of performing chemical polymerization in the presence of the ionic liquid, a method of adding an oxidant to a solution containing the monomer (A) constituting the conductive polymer and the aforementioned ionic liquid (B) and performing chemical polymerization with this solution can be preferably employed. In this case, a solvent may be added to the solution, for adjusting the viscosity and the concentration. The solvent may be prepared from a well-known material such as water, an alcohol-based solvent, an ether-based solvent, a nitrile-based solvent, a ketone-based solvent, an amide-based solvent, a carbonate-based solvent, an ester-based solvent, a lactone-based solvent, a sulfur-containing solvent, a halogenated hydrocarbon solvent or a hydrocarbon-based solvent, and at least two types of such solvents may be employed.

The chemical polymerization may be performed under well-known conditions, and is preferably performed in the temperature range of −100° C. to 200° C. for one minute to 120 hours. More preferably, polymerization is performed in the temperature range of 0° C. to 150° C. for one minute to 60 minutes. This polymerization may be repeated a plurality of times.

The aforementioned aging step, not excluding any method according to recognition of those skilled in the art or an improvement of the method, is a step of applying a constant voltage to a capacitor element including the prepared electrolyte under heating and/or moistening. Either an unarmored capacitor element or an armored capacitor element can be aged.

When the forming voltage $x$ applied to the valve metal for forming the dielectric oxide film is not more than 48 V, the maximum value (aging voltage $y$) of the voltage applied in the aging step is at least 50% and not more than 100% of the forming voltage $x$, more preferably at least 60% and not more than 88% of the forming voltage $x$. At this time, the voltage applied in the aging step is preferably increased from 0 V at a constant speed, so that the maximum voltage is in the range of 50% to 100% of the forming voltage $x$. In this case, the aging voltage $y$ is defined as the maximum voltage.

When the forming voltage $x$ is in excess of 48 V, on the other hand, the aging voltage $y$ is set to at least 24 V, preferably at least 28.8 V. Also in this case, the voltage applied in the aging step is preferably increased from 0 V at a constant speed, similarly to the above.

When the forming voltage $x$ is not more than 48 V, an electrolytic capacitor employable at a higher voltage than a conventional electrolytic capacitor obtained through aging at a voltage of not more than 50% of the forming voltage $x$, i.e., an electrolytic capacitor excellent in withstand voltage characteristic can be obtained by carrying out the aging step in the voltage range of at least 50% of the forming voltage $x$. In order to implement an electrolytic capacitor having an unprecedentedly high capacitance, the aging step is preferably carried out with an aging voltage $y$ in the range of at least 60% of the forming voltage $x$. If the electrolytic capacitor is used at the same voltage, it follows that the forming voltage $x$ for the anode foil of the electrolytic capacitor can be set to a low level when the electrolytic capacitor can be aged with the aging voltage $y$ in the range of at least 50%, more preferably at least 60% of the forming voltage $x$. When the forming voltage $x$ can be set to a low level, the thickness of the oxide film can be reduced so that the distance between the anode foil and the electrolyte can be reduced, whereby an electrolytic capacitor having a high capacitance can be obtained.

In order to implement a low impedance in addition to the high capacitance, the aging voltage $y$ is preferably set to not more than 88% of the forming voltage $x$. When the aging voltage $y$ is not more than 88% of the forming voltage $x$, a dense oxide film having excellent adhesiveness to the electrode is formed, whereby an excellent impedance characteristic is conceivably obtained.

When the forming voltage $x$ is in excess of 48 V, on the other hand, an electrolytic capacitor having a high capacitance can be obtained by carrying out the aging step with the aging voltage $y$ in the range of at least 24 V. In order to implement an electrolytic capacitor having an unprecedentedly high capacitance, the aging step is preferably carried out with an aging voltage $y$ of at least 28.8 V. In order to implement a low impedance in addition to the high capacitance, further, the aging voltage $y$ is preferably set to not more than 88% of the forming voltage $x$.

The aging voltage $y$ is preferably not in excess of the forming voltage $x$. When the voltage applied in the aging step is increased from 0 V, a current gradually starts increasing when the voltage is in excess of 90% of the forming voltage $x$, and is so increased that the aging step cannot be carried out if the voltage is in excess of 100%. If the voltage is in the range of 90 to 100% of the forming voltage $x$, the current can be reduced to a specified range by increasing the aging time, and the aging step can be basically carried out in this range. However, a long time is required for reducing the current to the specified range, and hence the aging voltage $y$ is more preferably set to not more than 90% of the forming voltage $x$.

The following conditions can be illustrated as exemplary aging conditions: The voltage applied to the capacitor element is increased at a speed of 20 mV/sec., and a voltage at which a current of 10 mA flows is defined as a breakdown voltage for carrying out the aging step. This increase of the voltage is stopped when the current exceeds 0.1 mA, and this state is kept until the current is below a specific level (not more than 10 μA, for example). Finally, the voltage is increased to a predetermined level (aging voltage $y$), and this state is kept for a constant time, for completing the aging step.

According to the aforementioned inventive method of manufacturing a conductive polymer electrolytic capacitor, the aging step can be carried out at the voltage of at least 50% of the forming voltage, and an electrolytic capacitor having a high withstand voltage can be prepared.

While the present invention is now described in more detail with reference to Examples, the present invention is not restricted to these.

EXAMPLES

Ionic Liquid

ILs

The following ionic liquids were employed in Examples and comparative examples:

ILs-1: $(1\text{-}C_4H_9\text{-}3\text{-}CH_3\text{-}Im)^+(CH_3OSO_3)^-$ (chemical name: 1-Butyl-3-methyl-imidazolium methylsulfate, purchased from Merck & Co. Ltd.)

ILs-2: $(1\text{-}C_2H_5\text{-}3\text{-}CH_3\text{-}Im)^+(H(CH_2)_6OSO_3)^-$ (chemical name: 1-Ethyl-3-methyl-imidazolium n-hexylsulfate, purchased from Solvent Innovation GmbH)

ILs-3: $(1\text{-}C_2H_5\text{-}3\text{-}CH_3\text{-}Im)^+(CH_3(CH_2)_3OSO_3)^-$ (chemical name: 1-Ethyl-3-methyl-imidazolium n-butylsulfate, purchased from Solvent Innovation GmbH)

ILs-4: $(1\text{-}C_2H_5\text{-}3\text{-}CH_3\text{-}Im)^+(p\text{-}TsO)^-$ (chemical name: 1-Ethyl-3-methyl-imidazolium n-tosylate, purchased from Strem Chemicals, Inc.)

<Preparation of Wound-Type Electrode>

Anode foils and cathode foils employed in Examples and comparative examples are as follows:

Wound-type electrodes were prepared by employing aluminum etched foils U157, purchased from KDK Corp., anodized at prescribed forming voltages $x$ as anode foils while employing aluminum etched foils C208 as cathode foils. The length and the width of the anode foils were 90 mm and 2.2 mm respectively. Anode foils were prepared with four types of forming voltages $\underline{x}$ of 13 V, 24 V, 55 V and 70 V respectively, for forming four types of wound-type electrodes. Each of the prepared wound-type electrodes was dipped in a 1% aqueous solution of ammonium adipate with a measurement cell shown in FIG. 1, and performed repair/forming by increasing a voltage from 0 V to each forming voltage $\underline{x}$ at a speed of 20 mV/sec. and thereafter applying the constant forming voltage $\underline{x}$ for 40 minutes.

<Measurement of In-Liquid Capacitance)

The in-liquid capacitance of each wound-type electrode performed repair/forming was calculated from inclination of a graph obtained in a constant-current charge/discharge test in the range of 0 to 4 V at 50 μA with a charge/discharge measurement apparatus by Toyo Corporation. The measurement was conducted at the room temperature. The average in-liquid capacitances of the wound-type electrodes performed forming at 13 V, 24 V, 55 V and 70 V were 186 μF, 108 μF, 57 μF and 40 μF respectively.

<Measurement of Initial Capacitance>

Wound-type capacitor elements were obtained by forming electrolytes with the obtained wound-type electrodes by chemical polymerization. The electrolytes were formed by methods described in relation to the following Examples and comparative examples described later respectively. After formation of the electrolytes, initial capacitances were measured. The capacitances were calculated from inclination of a graph obtained in a constant-current charge/discharge test in the range of 0 to 4 V at 50 μA with a charge/discharge measurement apparatus by Toyo Corporation. The measurement was conducted at the room temperature. Capacitance development ratios were calculated from the in-liquid capacitances and the initial capacitances of the wound-type electrodes obtained in the aforementioned manner as follows:

Capacitance development ratio=(in-liquid capacitance of wound-type electrode/initial capacitance of wound-type electrode)×100(%)

<Aging Method>

The wound-type capacitor elements were aged by increasing voltages from 0 V up to aging voltages $\underline{y}$ described in the following Examples and comparative examples respectively under an environment of 100° C. at a speed of 20 mV/sec and thereafter applying the constant aging voltages $\underline{y}$ for 40 minutes. The specified current of the wound-type capacitor elements was defined as 10 mA, and elements exceeding this current level in the process of voltage increase or voltage keeping were regarded as defectively aged.

<Measurement of Impedance>

After the aging, impedances were measured in the room temperature atmosphere. An impedance analyzer by Toyo Corporation was employed for measuring the impedances under conditions of a DC potential of 0 V and an AC amplitude of 100 V, in the range of 1 Hz to 1 MHz. Impedances at 20 kHz were defined as the impedances of the wound-type capacitor elements.

<Measurement of Withstand Voltage>

After the aging, withstand voltages (V) were measured. The withstand voltages were measured with "TR6143" by Advantest Corporation, by increasing voltages to the aging voltages $\underline{y}$ at the room temperature at a speed of 1.0 V/sec. Voltages at which a current of 10 mA flowed were defined as the withstand voltages, and wound-type capacitor elements reaching this current during the measurement were regarded as having defective withstand voltages. Withstand voltages of 20 samples were measured as to each of Examples and comparative examples. The number of capacitor elements, included in the 20 samples, broken in the aforementioned voltage range was confirmed. The defective capacitor elements included the aforementioned defectively aged elements.

Examples 1 to 5

Each conductive polymer aluminum electrolytic capacitor was prepared by impregnating the wound-type electrode prepared with the forming voltage $\underline{x}$ of 24 V with a polymerization solution and thereafter drying the same. More specifically, a polymerization solution was prepared from 0.1 g of 3,4-ethylenedioxy thiophene (hereinafter abbreviated as EDOT: by H. C. Starck-V TECH Ltd.) employed as a monomer for the conductive polymer, 0.20 g of iron paratoluenesulfonate employed as an oxidant, 0.30 g of 1-butanol employed as a solvent and 0.032 g of an ionic liquid (ILs-1). The molar ratios between the monomer, the oxidant and the ionic liquid were 1:0.5:0.1. The polymerization solution was prepared by mixing these raw materials with each other in a thoroughly dried beaker.

Then, the aforementioned wound-type electrode was dipped in the polymerization solution to be impregnated with the polymerization solution, pulled up, and thereafter heated at 120° C. for one hour. This treatment was repeated four times, and the electrolyte was so formed as to uniformly cover the surface of the foil.

The initial capacitances of the obtained wound-type capacitor elements were measured, for calculating capacitance development ratios. Further, the impedances and the withstand voltages (V) of the aged wound-type capacitor elements were measured. Table 1 shows the results. Table 1 also shows the aging voltages $\underline{y}$. Referring to Table 1, the capacitance development ratio and the impedance of each of Examples and comparative examples were average values of 20 samples, and the withstand voltage characteristic was evaluated as the ratio of elements broken at a voltage below the aging voltage $\underline{y}$ as described above.

TABLE 1

|  | Ionic Liquid | Forming Voltage x (V) | Aging Voltage y (V) | Capacitance Development Ratio (%) | Impedance (mΩ) | Number of Broken Elements in 20 Samples |
|---|---|---|---|---|---|---|
| Example 1 | ILs-1 | 24 | 12 | 91 | 102 | 0 |
| Example 2 | ILs-1 | 24 | 15 | 92 | 97 | 0 |
| Example 3 | ILs-1 | 24 | 18 | 88 | 98 | 0 |
| Example 4 | ILs-1 | 24 | 21 | 89 | 99 | 0 |
| Example 5 | ILs-1 | 24 | 23 | 89 | 103 | 0 |
| Comparative | no | 24 | 12 | 88 | 104 | 1 |

TABLE 1-continued

|  | Ionic Liquid | Forming Voltage x (V) | Aging Voltage y (V) | Capacitance Development Ratio (%) | Impedance (mΩ) | Number of Broken Elements in 20 Samples |
|---|---|---|---|---|---|---|
| Example 1 |  |  |  |  |  |  |
| Comparative Example 2 | no | 24 | 18 | 89 | 100 | 3 |
| Comparative Example 3 | no | 24 | 21 | 87 | 103 | 5 |
| Comparative Example 4 | ILs-1 | 24 | 10 | 89 | 106 | 0 |

Comparative Examples 1 to 3

Samples of electrolytic capacitors according to comparative examples 1 to 3 were prepared similarly to Example 1 except that polymerization solutions contained no ionic liquids, and subjected to various measurements. In other words, electrolytes consisted of EDOT, oxidants and butanol solvents in comparative examples 1 to 3. Table 1 also shows the results of the measurements.

From the results of Examples 1 to 5, it is understood that the capacitor element can be aged at an aging voltage of 21 V with respect to the forming voltage of 24 V and has a sufficient withstand voltage up to the aging voltage when the electrolyte contains an ionic liquid. Referring to the results of comparative examples 1 to 3, on the other hand, one sample exhibited a defective withstand voltage in 12-V aging (aging at the aging voltage of 12 V), three samples exhibited defective withstand voltages in 18-V aging and five samples exhibited defective withstand voltages in 21-V aging in the case of the electrolytes containing no ionic liquids.

Comparative Example 4

Samples of an electrolytic capacitor having an electrolyte containing an ionic liquid according to comparative example 4 were prepared similarly to Example 1 except that an aging voltage was set to 10 V, and subjected to various measurements. Table 1 also shows the results of the measurements. As compared with Examples 1 to 5, comparative example 4 having the low aging voltage exhibited an inferior impedance characteristic. From these results, superiority of the inventive method aging the capacitor element at the aging voltage of at least 50% of the forming voltage has been confirmed in relation to the electrolytic capacitor having the electrolyte containing the ionic liquid.

Examples 6 to 8

Electrolytic capacitors having electrolytes containing ionic liquids according to Examples 6 to 8 were prepared similarly to Example 1 except that other types of ionic liquids were employed, and subjected to various measurements. Table 2 shows the results of the measurements. Effects similar to those of ILs-1 were recognized in each of ILs-2, ILs-3 and ILs-4.

TABLE 2

|  | Ionic Liquid | Forming Voltage x (V) | Aging Voltage y (V) | Capacitance Development Ratio (%) | Impedance (mΩ) | Number of Broken Elements in 20 Samples |
|---|---|---|---|---|---|---|
| Example 6 | ILs-2 | 24 | 18 | 91 | 112 | 0 |
| Example 7 | ILs-3 | 24 | 18 | 87 | 108 | 0 |
| Example 8 | ILs-4 | 24 | 18 | 87 | 104 | 0 |

Examples 9 to 21

Electrolytic capacitors having electrolytes containing ionic liquids according to Examples 9 to 21 were prepared similarly to Example 1 except that other forming voltages and other aging voltages were employed, and subjected to various measurements. Table 3 shows the results of the measurements. According to the inventive method, the capacitor elements were not only ageable at aging voltages of at least 24 V at both of the forming voltages of 55 V and 70 V but also ageable at aging voltages of 50 V and 56 V at the forming voltages of 55 V and 70 V respectively, and no sample exhibited a defective withstand voltage at least under the aging voltages. Thus, it has been confirmed possible to manufacture a conductive polymer electrolytic capacitor having a high withstand voltage, which has been impossible to manufacture in general, according to the inventive method.

Comparative Examples 5 to 16

Electrolytic capacitors according to comparative examples 6 to 8 and 10 to 16 were prepared similarly to Examples 9 to 21 except that electrolytes contained no ionic liquids, and subjected to various measurements. Table 3 also shows the results of the measurements. While one sample exhibited a defective withstand voltage when the forming voltage was 13 V and the aging voltage was 7 V, the number of samples exhibiting defective withstand voltages were increased as the aging voltage was increased. This tendency was remarkably observed as the forming voltages were increased, and most or all samples exhibited defective withstand voltages under the conditions of the forming voltage of 55 V and the aging voltage of 48 V (comparative example 13) and under the conditions of the forming voltage of 70 V and the aging voltage of 56 V (comparative example 16).

On the other hand, electrolytic capacitors according to comparative examples 5 and 9 were prepared similarly to Examples 9 and 14 respectively except that other aging voltages were employed, and subjected to various measurements. Table 3 also shows the results of the measurements. Comparative examples 5 and 9 having low aging voltages exhibited inferior impedance characteristics.

Superiority of the present invention has been clarified from comparison between Examples 9 to 21 and comparative examples 5 to 16.

Also when the molar ratios of the ionic liquids were 0.01 (Examples 22 to 25), effects of improving withstand voltages were recognized as compared with the electrolytic capacitors containing no ionic liquids (comparative examples 10 to 13), and the electrolytic capacitors were ageable at aging voltages of 36 V. When the aging voltage was 50 V, however, 7 elements exhibited defective withstand voltages among 20 samples (Example 25). When the molar ratios of the ionic

TABLE 3

|  | Ionic Liquid | Forming Voltage x (V) | Aging Voltage y (V) | Capacitance Development Ratio (%) | Impedance (mΩ) | Number of Broken Elements in 20 Samples |
|---|---|---|---|---|---|---|
| Example 9 | ILs-1 | 13 | 7 | 92 | 150 | 0 |
| Example 10 | ILs-1 | 13 | 7.8 | 93 | 147 | 0 |
| Example 11 | ILs-1 | 13 | 10 | 92 | 147 | 0 |
| Example 12 | ILs-1 | 13 | 11.5 | 92 | 147 | 0 |
| Example 13 | ILs-1 | 13 | 12 | 90 | 151 | 0 |
| Example 14 | ILs-1 | 55 | 24 | 87 | 90 | 0 |
| Example 15 | ILs-1 | 55 | 36 | 86 | 87 | 0 |
| Example 16 | ILs-1 | 55 | 42 | 83 | 88 | 0 |
| Example 17 | ILs-1 | 55 | 48 | 84 | 88 | 0 |
| Example 18 | ILs-1 | 55 | 50 | 84 | 92 | 0 |
| Example 19 | ILs-1 | 70 | 24 | 80 | 75 | 0 |
| Example 20 | ILs-1 | 70 | 40 | 82 | 75 | 0 |
| Example 21 | ILs-1 | 70 | 56 | 83 | 78 | 0 |
| Comparative Example 5 | ILs-1 | 13 | 5 | 89 | 159 | 0 |
| Comparative Example 6 | no | 13 | 7 | 90 | 144 | 1 |
| Comparative Example 7 | no | 13 | 10 | 87 | 136 | 4 |
| Comparative Example 8 | no | 13 | 12 | 87 | 145 | 16 |
| Comparative Example 9 | ILs-1 | 55 | 20 | 85 | 95 | 0 |
| Comparative Example 10 | no | 55 | 24 | 86 | 84 | 1 |
| Comparative Example 11 | no | 55 | 36 | 87 | 83 | 2 |
| Comparative Example 12 | no | 55 | 42 | 82 | 86 | 10 |
| Comparative Example 13 | no | 55 | 48 | 80 | 85 | 15 |
| Comparative Example 14 | no | 70 | 24 | 82 | 74 | 2 |
| Comparative Example 15 | no | 70 | 40 | 80 | 75 | 13 |
| Comparative Example 16 | no | 70 | 56 | 81 | 74 | 20 |

Figure 2:
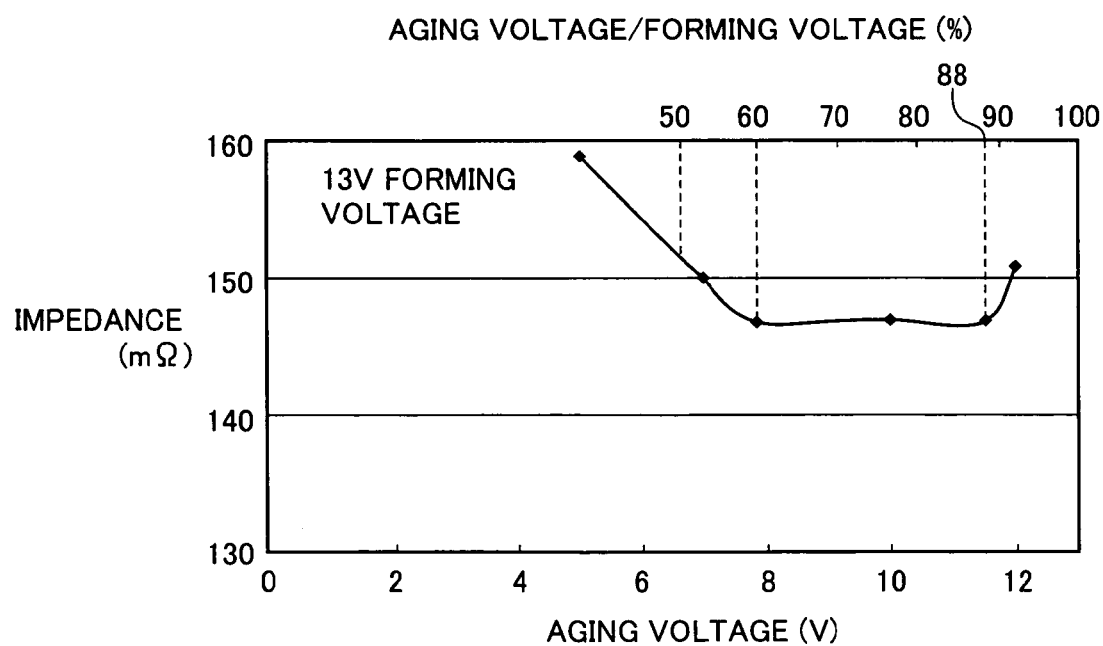
FIG. 2 is a graph showing aging voltage dependency of the impedance of a wound-type capacitor element receiving a forming voltage of 13 V.
Figure 3:
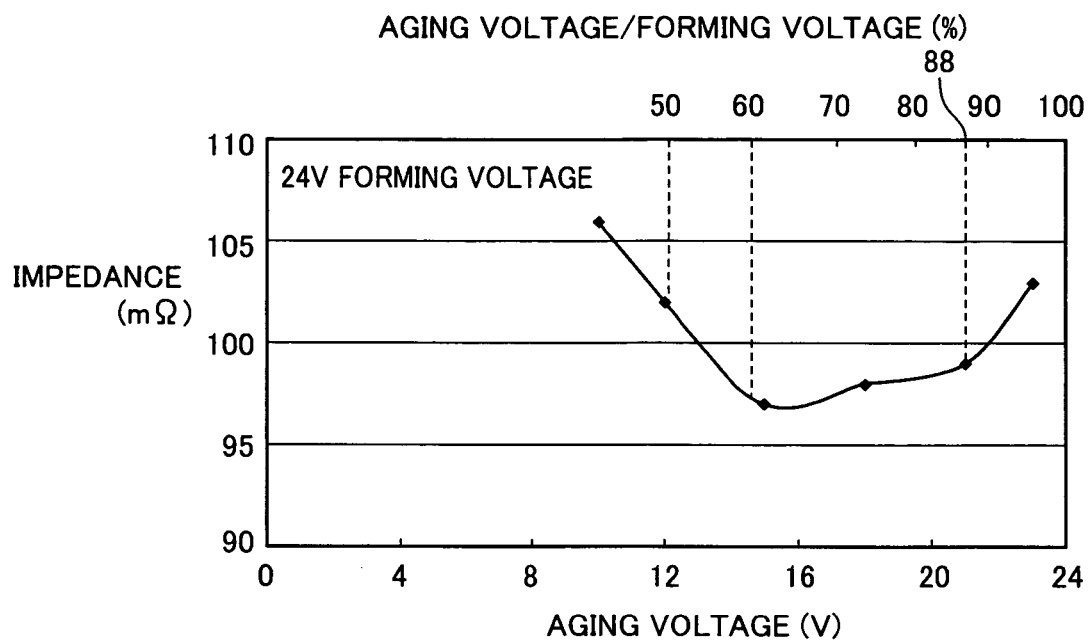
FIG. 3 is a graph showing aging voltage dependency of the impedance of a wound-type capacitor element receiving a forming voltage of 24 V.
Figure 4:
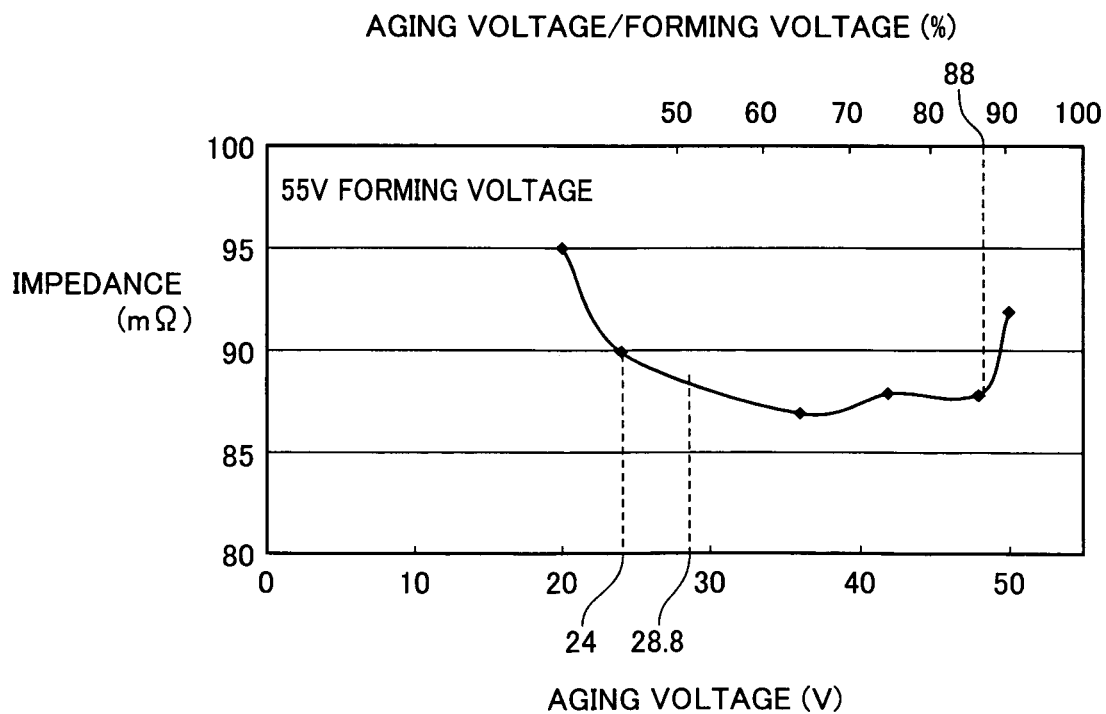
FIG. 4 is a graph showing aging voltage dependency of the impedance of a wound-type capacitor element receiving a forming voltage of 55 V.

FIGS. 2, 3 and 4 are graphs showing aging voltage dependencies of impedances of wound-type capacitor elements receiving forming voltages of 13 V, 24 V and 55 V respectively. It has been recognized that all these wound-type capacitor elements exhibited excellent ESR when aging voltages of at least 60% and not more than 88% of the forming voltages were applied thereto.

Examples 22 to 45

Electrolytic capacitors according to Examples 22 to 45 were prepared similarly to Example 1 except that the molar ratios of ionic liquids (ILs-1) to monomers were set to 0.01, 0.02, 0.05, 0.2, 0.5 or 1.0 and forming voltages were set to 55 V, and subjected to various measurements. The molar ratios of oxidants with respect to the monomers were set to a constant level of 0.25. Table 4 shows the results of the measurements.

liquids were 0.02 (Examples 26 to 29), the electrolytic capacitors were ageable at aging voltages of 42 V, while one of 20 samples exhibited a defective withstand voltage when the aging voltage was 50 V (Example 29).

When the molar ratios of the ionic liquids were 1.0, the impedance characteristics tended to deteriorate although the samples exhibited excellent withstand voltage characteristics. Thus, it has been recognized that the optimum content of the ionic liquid with respect to one equivalent of the monomer is in the range of 0.01 to 1.0, more preferably in the range of 0.02 to 0.5, most preferably in the range of 0.05 to 0.2 when ILs-1 is employed. While this optimum range depends on the type of the ionic liquid and cannot be univocally decided, a similar tendency is generally recognized, and the range of the optimum content of the ionic liquid is 0.01 to 0.5

TABLE 4

| | Molar Ratio of Ionic Liquid | Forming Voltage x (V) | Aging Voltage y (V) | Capacitance Development Ratio (%) | Impedance (mΩ) | Number of Broken Elements in 20 Samples |
|---|---|---|---|---|---|---|
| Example 22 | 0.01 | 55 | 24 | 82 | 77 | 0 |
| Example 23 | 0.01 | 55 | 36 | 82 | 81 | 0 |
| Example 24 | 0.01 | 55 | 42 | 86 | 76 | 3 |
| Example 25 | 0.01 | 55 | 50 | 85 | 80 | 7 |
| Example 26 | 0.02 | 55 | 24 | 86 | 87 | 0 |
| Example 27 | 0.02 | 55 | 36 | 87 | 82 | 0 |
| Example 28 | 0.02 | 55 | 42 | 86 | 84 | 0 |
| Example 29 | 0.02 | 55 | 50 | 90 | 80 | 1 |
| Example 30 | 0.05 | 55 | 24 | 83 | 86 | 0 |
| Example 31 | 0.05 | 55 | 36 | 87 | 87 | 0 |
| Example 32 | 0.05 | 55 | 42 | 88 | 82 | 0 |
| Example 33 | 0.05 | 55 | 50 | 91 | 90 | 0 |
| Example 34 | 0.2 | 55 | 24 | 86 | 107 | 0 |
| Example 35 | 0.2 | 55 | 36 | 83 | 118 | 0 |
| Example 36 | 0.2 | 55 | 42 | 84 | 92 | 0 |
| Example 37 | 0.2 | 55 | 50 | 80 | 105 | 0 |
| Example 38 | 0.5 | 55 | 24 | 92 | 150 | 0 |
| Example 39 | 0.5 | 55 | 36 | 92 | 147 | 0 |
| Example 40 | 0.5 | 55 | 42 | 90 | 131 | 0 |
| Example 41 | 0.5 | 55 | 50 | 92 | 130 | 0 |
| Example 42 | 1 | 55 | 24 | 96 | 489 | 0 |
| Example 43 | 1 | 55 | 36 | 95 | 508 | 0 |
| Example 44 | 1 | 55 | 42 | 95 | 762 | 0 |
| Example 45 | 1 | 55 | 50 | 96 | 797 | 0 |

It has been possible to confirm the superiority of the present invention with reference to the aforementioned Examples. In other words, the aging step can be performed according to the present invention in the unprecedented voltage region by introducing the ionic liquid into the electrolyte, thereby providing a conductive polymer electrolytic capacitor having a high withstand voltage, which has been unobtainable in general.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a conductive polymer electrolytic capacitor having a capacitor element including an electrolyte containing a conductive polymer prepared from a monomer (A) and an ionic liquid (B) and an electrode consisting of a valve metal, comprising the step of:

aging said capacitor element including said electrolyte by applying an aging voltage y (V) to said capacitor element including said electrolyte to satisfy the following formula (2):

$$24 \leq y \leq x(48-x) \qquad (2)$$

(in the above formula (2), x represents a forming voltage (V) for said valve metal).

2. The method of manufacturing a conductive polymer electrolytic capacitor according to claim 1, comprising the step of aging said capacitor element including said electrolyte by applying said aging voltage y (V) to satisfy the following formula (4):

$$28.8 \leq y \leq 0.88x(48-x) \qquad (4)$$

(in the above formula (4), x represents the forming voltage (V) for said valve metal).

3. The method of manufacturing a conductive polymer electrolytic capacitor according to claim 1, wherein
the molar ratio $N_B/N_A$ between said monomer (A) and said ionic liquid (B) is 0.01/1 to 0.5/1.

4. The method of manufacturing a conductive polymer electrolytic capacitor according to claim 1, wherein
said monomer (A) is at least one monomer selected from a group consisting of pyrrole and a derivative thereof, thiophene and a derivative thereof, aniline and a derivative thereof and quinone and a derivative thereof.

5. The method of manufacturing a conductive polymer electrolytic capacitor according to claim 1, wherein
an anionic component of said ionic liquid (B) includes at least one component selected from a group consisting of a carboxylate anion derivative, a sulfonyl imide anion derivative, a fluoroborate anion derivative, a nitrate anion derivative, a cyanoimide anion derivative, a sulfonate anion derivative and an alkoxysulfonate anion derivative.

6. The method of manufacturing a conductive polymer electrolytic capacitor according to claim 5, wherein
said sulfonate anion derivative is an anionic component expressed in the following general formula (I):

$$R_1\text{—}SO_3^- \qquad (I)$$

(in the above general formula (I), $R_1$ represents an aliphatic hydrocarbon radical having a carbon number of 1 to 30, which may be substituted by an O, S, NHCO or CO radical, and may contain at least one fluorine atom).

7. The method of manufacturing a conductive polymer electrolytic capacitor according to claim 6, wherein
$R_1$ in said general formula (I) is a straight-chain saturated hydrocarbon radical having a carbon number of 1 to 7.

8. The method of manufacturing a conductive polymer electrolytic capacitor according to claim 5, wherein
said alkoxysulfonate anion derivative is an anionic component expressed in the following general formula (II):

$$R_2\text{—}OSO_3^- \qquad (II)$$

(in the above general formula (II), $R_2$ represents an aliphatic hydrocarbon radical having a carbon number of 1 to 30, which may be substituted by an O, S, NHCO or CO radical, and may contain at least one fluorine atom).

9. The method of manufacturing a conductive polymer electrolytic capacitor according to claim 8, wherein
$R_2$ in said general formula (II) represents a straight-chain saturated hydrocarbon radical having a carbon number of 1 to 7.

10. The method of manufacturing a conductive polymer electrolytic capacitor according to claim 1, wherein
a cationic component of said ionic liquid (B) includes at least one component selected from a group consisting of ammonium and a derivative thereof, imidazolinium and a derivative thereof, pyridinium and a derivative thereof, pyrrolidinium and a derivative thereof, pyrrolinium and a derivative thereof, pyrazinium and a derivative thereof, pyrimidinium and a derivative thereof, triazonium and a derivative thereof, triazinium and a derivative thereof, triazine derivative cation, quinolinium and a derivative thereof, isoquinolinium and a derivative thereof, indolinium and a derivative thereof, quinoxalinium and a derivative thereof, piperazinium and a derivative thereof, oxazolinium and a derivative thereof, thiazolinium and a derivative thereof, morpholinium and a derivative thereof and piperazine and a derivative thereof.

* * * * *